United States Patent [19]
Van Ostenbridge et al.

[11] 4,071,102
[45] Jan. 31, 1978

[54] AUTO ZERO CIRCUIT

[75] Inventors: Ron Van Ostenbridge, Glassboro; Michael E. Sturgeon, Sicklerville, both of N.J.

[73] Assignee: K-Tron Corporation, Glassboro, N.J.

[21] Appl. No.: 727,110

[22] Filed: Sept. 27, 1976

[51] Int. Cl.² .................... G01G 13/14; G01G 23/14
[52] U.S. Cl. ................................. 177/165; 222/55; 198/504; 364/567
[58] Field of Search ............... 222/55, 56, 63, 77; 235/151.3, 151.33; 177/16, 165, 210 FP; 198/504, 505

[56] References Cited
U.S. PATENT DOCUMENTS

| 2,974,518 | 3/1961 | Jones | 177/165 X |
| 3,447,906 | 6/1969 | Zimmerli | 222/77 X |
| 3,724,720 | 4/1973 | Bullivant | 222/55 X |
| 3,853,267 | 12/1974 | Cadwell et al. | 235/151.33 |
| 3,868,643 | 2/1975 | Bullivant | 222/55 X |
| 3,976,150 | 8/1976 | Wilson et al. | 177/16 |

Primary Examiner—Stanley H. Tollberg
Assistant Examiner—Joseph J. Rolla
Attorney, Agent, or Firm—Seidel, Gonda & Goldhammer

[57] ABSTRACT

Apparatus for generating a belt tare compensation signal including a load cell in operative contact with a feed conveyor belt dividable into N equal segments. The output of the load cell is strobed each time the conveyor belt advances one sampled and a pulse train representative of the output of the load cell is generated. The pulse train is applied to a pulse counter if the output of the load cell is greater than a predetermined value and is applied to a minus counter if the output of the load cell is less than a predetermined value. At the end of a single revolution of the conveyor belt, a signal representative of the difference between the count in the plus and minus counters is generated. This signal is divided by N so as to generate a belt tare compensation signal which is representative of the average output of the load cell during a single non-loaded revolution of the conveyor belt.

12 Claims, 3 Drawing Figures

AUTO ZERO CIRCUIT

BACKGROUND OF THE INVENTION

The present invention is directed towards an apparatus for generating a belt tare compensation signal. More particularly, the present invention is directed towards an apparatus for generating a belt tare compensation signal which may be added or subtracted to the output of a load cell so that the resultant signal is a true indication of the weight of material on a belt feeder.

In various types of material feeders, for example, that disclosed in U.S. Pat. No. 3,724,720, the output of a load cell in operative contact with a conveyor belt feeder is utilized to control the batch size of material delivered by such conveyor systems. In the aforesaid patent, the belt tare is compensated for by a mechanically adjusted tare control which may be a zero adjust on a commercially available digital voltmeter. When using such control, the operator runs the belt feeder under no load conditions and visually adjusts the tare control so that the output of the voltmeter hovers around zero during the entire belt revolution.

While such a system provides a gross compensation for belt tare, variations in the thickness and density of the conveyor belt prevents such adjustments from providing an accurate count compensation for belt tare. Additionally, material deposited on the belt during operation of the conveyor feeder causes the accuracy of any mechanically adjusted signal to be temporary at best.

In an effort to overcome these and other disadvantages of such hand adjustments, the present invention provides an automatic circuit for generating a belt tare compensation signal which is representative of the average output of the load cell during a single non-loaded revolution of the conveyor belt. While such a system may be inaccurate for any single portion of the belt, these errors will be fully compensated for during any complete revolution of the belt.

Among the relevant prior art are U.S. Pat. Nos. 3,665,169 and 3,853,267.

For the purpose of illustrating the invention, there is shown in the drawings a form which is presently preferred; it being understood, however, that this invention is not limited to the precise arrangement and instrumentalities shown.

DETAILED DESCRIPTION OF THE PREFERRED EMBODIMENT

Figure 1:
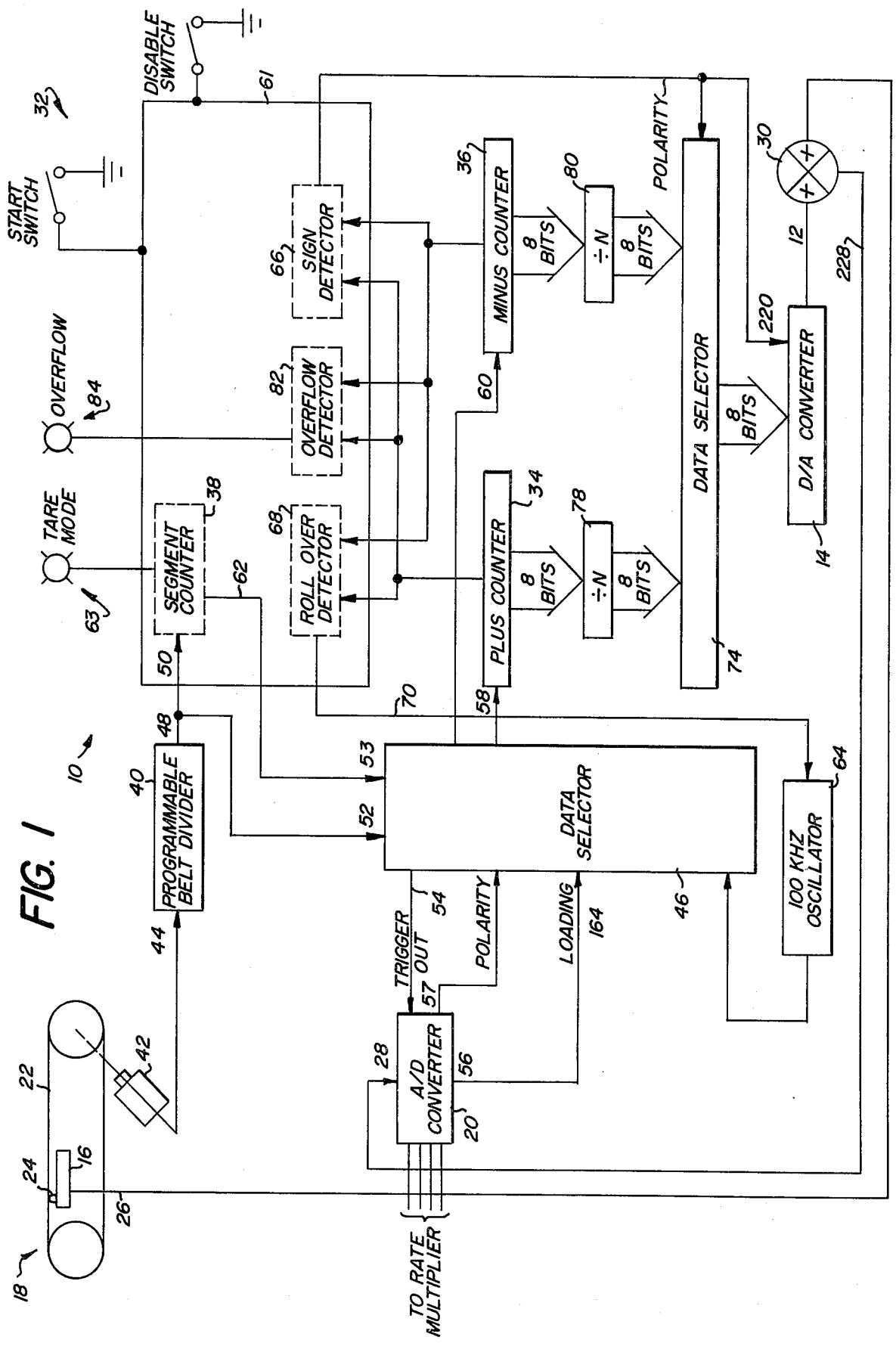
FIG. 1 is a logic diagram illustrating the control circuit comprising the present invention.

Referring now to the drawings, wherein like numerals indicate like elements, there is shown in FIG. 1 the logic diagram for an auto zero circuit constructed in accordance with the present invention and designated generally as 10. Auto zero circuit 10 computes the average output of load cell 16 for a single, non-loaded revolution of belt 22 and generates a belt tare compensation signal which is the complement of this computed value. The belt tare compensation signal is then added to the output of load cell 16 during loaded operations of conveyor 18 to compensate for belt tare. The belt tare compensation signal is representative of the average output of load cell 16 during a single non-loaded revolution of belt 22. Over any complete revolution of belt 22, the compensated output of load cell 16 will accurately represent the mass of material delivered to feeder 18.

The compensated output of load cell 16 (on line 228) may be utilized in any desired weighing system. In one such application, the compensated output of load cell 16 is applied to analog to digital (A/D) converter 20 whose output is applied to the rate multiplier of a digital mass flow control system such as that described in U.S. Pat. No. 3,724,720. While auto zero circuit 10 may be used in connection with a digital mass flow control system such as that disclosed in the foregoing patent, it may also be used with other systems requiring the generation of a belt tare compensation signal.

Turning now to the description of auto zero circuit 10, load cell 16 generates an output signal on line 26 which is representative of the weight of material on belt 22 of conveyor 18. Load cell 16 is preferably a conventional LVDT and may be a Type 407000 load cell manufactured by K-Tron Corporation. The weight of material on belt 22 causes arm 24 (which is in operative contact with belt 22) to be deflected an amount proportional to the instantaneous mass of material on belt 22. Load cell 16 responds by producing an analog signal on its output line 26 representative of the instantaneous mass of the material on belt 22.

Load cell 16 includes an internal zero adjustment. By turning the screw adjustment an appropriate amount, it is possible to obtain a zero level output on line 26 when the only mass on arm 24 is that of belt 22. While this gross adjustment provides some compensation for belt tare, variations in the thickness and density of belt 22 prevents such adjustment from providing an accurate compensation for belt tare for an entire revolution of belt 22. Additionally, material deposited on belt 22 during the operation of conveyor feeder 18 causes the accuracy of any mechanically adjusted compensation signal to be temporary at best. Accordingly, auto zero circuit 10 computes the average output of load cell 16 during non-loaded conditions and adds the complement of this value to the output of load cell 16. In this manner, the total output of adder circuit 30 for any complete revolution of belt 22 will be representative of the actual weight of material on belt 22 and will not include any errors due to the belt tare.

To initiate operation of auto zero circuit 10, start switch 32 is depressed. When start switch 32 is depressed, plus counter 34, minus counter 36, segment counter 38 and programmable belt divider 40 are reset. This places circuit 10 in the "compute" mode of operation. A motor (not shown) operatively associated with conveyor feeder 18 is manually operated to cause belt 22 to rotate.

The rotation of belt 22 is monitored by encoder 42 which applies a digital pulse train representative of the instantaneous speed of belt 22 to input terminal 44 of programmable belt divider 40. Encoder 42 is a conventional device for converting shaft rotation into a digital signal. One such device is disclosed in U.S. Pat. No. 3,724,720. In the preferred embodiment, the frequency of pulses generated by encoder 42 is directly proportional to the belt speed. Since the belt speed is also directly proportional to the incremental distance traversed by belt 22, the number of pulses generated by encoder 42 is representative of the distance traversed by belt 22.

As will be shown in greater detail below, data selector 46 strobes A/D converter 20, N times during a single revolution of belt 22. As used herein, the term "N" represents any positive integer greater than one. In order to compute an average output of load cell 16, auto zero circuit 10 effectively divides belt 22 into N equal segments. Programmable belt divider 40 is preprogrammed to generate a single pulse at its output terminal 48 each time belt 22 advances a distance equal to L/N, where "L" is the length of belt 22. The output signal generated by belt divider 40 is applied to input terminal 50 of segment counter 38 and input terminal 52 of data selector 46.

Data selector 46 strobes A/D converter 20 each time an output pulse is generated by belt divider 40 and applies the loading output of A/D converter 20 (output terminal 56) to either plus counter 34 or minus counter 36 in accordance with the polarity output (output terminal 57) of A/D converter 20. More specifically, data selector 46 applies the loading output of A/D converter 20 to plus counter 34 when the output of load cell 16 is positive and to minus counter 36 when the output of load cell 16 is negative. Data selector 46 so routes the loading output of A/D converter 20 until programmable belt divider 40 has generated N output pulses at which time auto zero circuit 10 switches from the "compute" to the "tared" mode of operation. At this time, the difference between the stored count in counters 34 and 36 is representative of the average output of load cell 16 for a single revolution of belt 22 during non-loaded conditions times N.

The loading output of A/D converter 20 is a pulse train which is representative of the magnitude of the analog output of load cell 16 at the time that A/D converter 20 is strobed by data selector 46. More particularly, the number of pulses generated by A/D converter 20 is proportional to the instantaneous output of load cell 16 at the time A/D converter 20 is strobed. The polarity signal generated by A/D converter 20 is, in the preferred embodiment, a "high" or a "low" which indicates whether the output of load cell 16 is positive or negative with respect to the mechanical tare at the time A/D converter 20 is strobed by data selector 46.

When the polarity signal indicates that the analog output of load cell 16 is positive, data selector 46 applies the output of A/D converter 20 to plus counter 34. Conversely, if the polarity signal on line 57 indicates that the analog output of load cell 16 is negative, data selector 46 applies the output of A/D converter 20 to minus counter 36. Counters 34 and 36 are commercially available counters whose stored count increases one count for each pulse applied thereto. When the count in either counter 34 or 36 reaches the maximum capacity of the counter, the counter overflows and again begins counting from zero. In the preferred embodiment, counters 34 and 36 generate an eight bit digital signal at their output terminals which signal is representative of the instantaneous stored count in the counter.

As noted above, data selector 46 strobes A/D converter 20, N times during a single revolution of belt 22 and routes the loading output of A/D converter 20 to counters 34 or 36 until belt divider 40 generates N pulses and auto zero circuit 10 switches from the "compute" to the "tared" mode of operation. This activity is controlled by segment counter 38 which is a commercially available counter whose stored count increases one count for each pulse applied to its input terminal 50. When segment counter 38 reaches the preselected value N, it generates a disabling signal on its output line 62 which transfers auto zero circuit 10 from the "compute" to "tared" mode of operation. This condition is indicated by tare mode indicator lamp 63.

In the tared mode of operation, data selector 46 simultaneously applies the output of 100 KHz oscillator 64 to inputs 58 and 60 of counters 34 and 36.

During the "tared" mode of operation, the operation of auto zero circuit 10 is controlled by logic circuit 61. Since the output of oscillator 64 is applied to counters 34 and 36, their stored count increases until both counters reach the overflow condition. The counter with the higher stored count at the end of the "compute" mode of operation overflows first. Sign detector 66 detects this event and stores a plus or minus polarity signal depending upon which of the plus and minus counters overflowed first. After the first counter overflows, it continues to count up from one until the second counter overflows. When rollover detector 68 has detected that both counters have overflowed, it generates a disable signal on line 70 which disables oscillator 64. No further pulses are applied to either counters 34 or 36.

At this point, the counter which had the lesser stored count at the end of the "compute" mode will be at zero while the counter which had a greater stored count will be at a value representative of the difference between the count in plus counter 34 and minus counter 36 at the end of the "compute" mode of operation. The stored counts in counters 34 and 36 are applied to data selector 74 via dividers 78 and 80 which divide the count in counters 34 and 36 by N. The operation of dividing by N is crucial since it has the effect of averaging the value of the counts in counters 34 and 36. It should be understood that the outputs of the counters can be selectively connected directly to data selector 74 to achieve the same effect as divided by N circuits 78 and 80. This is explained in greater detail in connection with FIGS. 2A and 2B hereinafter. Thus, auto zero circuit 10 takes N readings of the output of load cell 16 and stores in counter 34 or 36 a total value equal to the net number of pulses generated by A/D converter 20 during a single revolution of belt 22. To obtain a value equal to the average output of load cell 16, the count in counters 34 and 36 is divided by N.

When sign detector 66 detects that both counters have overflowed, it generates a polarity signal on line 72 which enables data selector 74 to apply the count in the counter which had the greater stored value at the end of the "compute" mode to D/A converter 14. Simultaneously, the polarity signal on line 72 is applied to D/A converter 14 and causes the output of the D/A converter (line 12) to be negative when the average output of load cell 16 is positive and to be positive when the average output of load cell 16 is negative. The output of D/A converter 14 is a belt tare compensation signal which is added to the output of load cell 16 via adder circuit 30 to compensate for the belt tare.

Another feature of auto zero circuit 10 is overflow detector 82. Overflow detector 82 detects if there is an overrange condition wherein either plus counter 34 or minus counter 36 overflows while auto zero circuit 10 is still in the "compute" mode. When this condition is detected, overflow detector 82 enables overflow indicator lamp 84 which indicates the overflow condition.

In the foregoing description of auto zero circuit 10, an integral zero adjust in load cell 16 was utilized as the gross adjustment for belt tare. As such, data selector 46 routed the loading output of A/D converter 20 to plus counter 34 or minus counter 36 in accordance with the polarity of the output of load cell 16. A possible variation on the present circuit is to utilize an external voltage supply and appropriate summing junction to provide for the gross adjustment for belt tare. In such a case, the data selector 46 would route the output A/D converter 20 to either plus counter 34 or minus counter 36 depending upon the magnitude of the output of load cell 16. That is, if the output of load cell 16 was greater than a predetermined value set by the externally generated compensation signal, data selector 46 would apply the output of A/D converter 20 to plus counter 34 and if the output of load cell 16 was less than the predetermined value, data selector 46 would route the output of load cell 16 to minus counter 36.

Figure 2A:
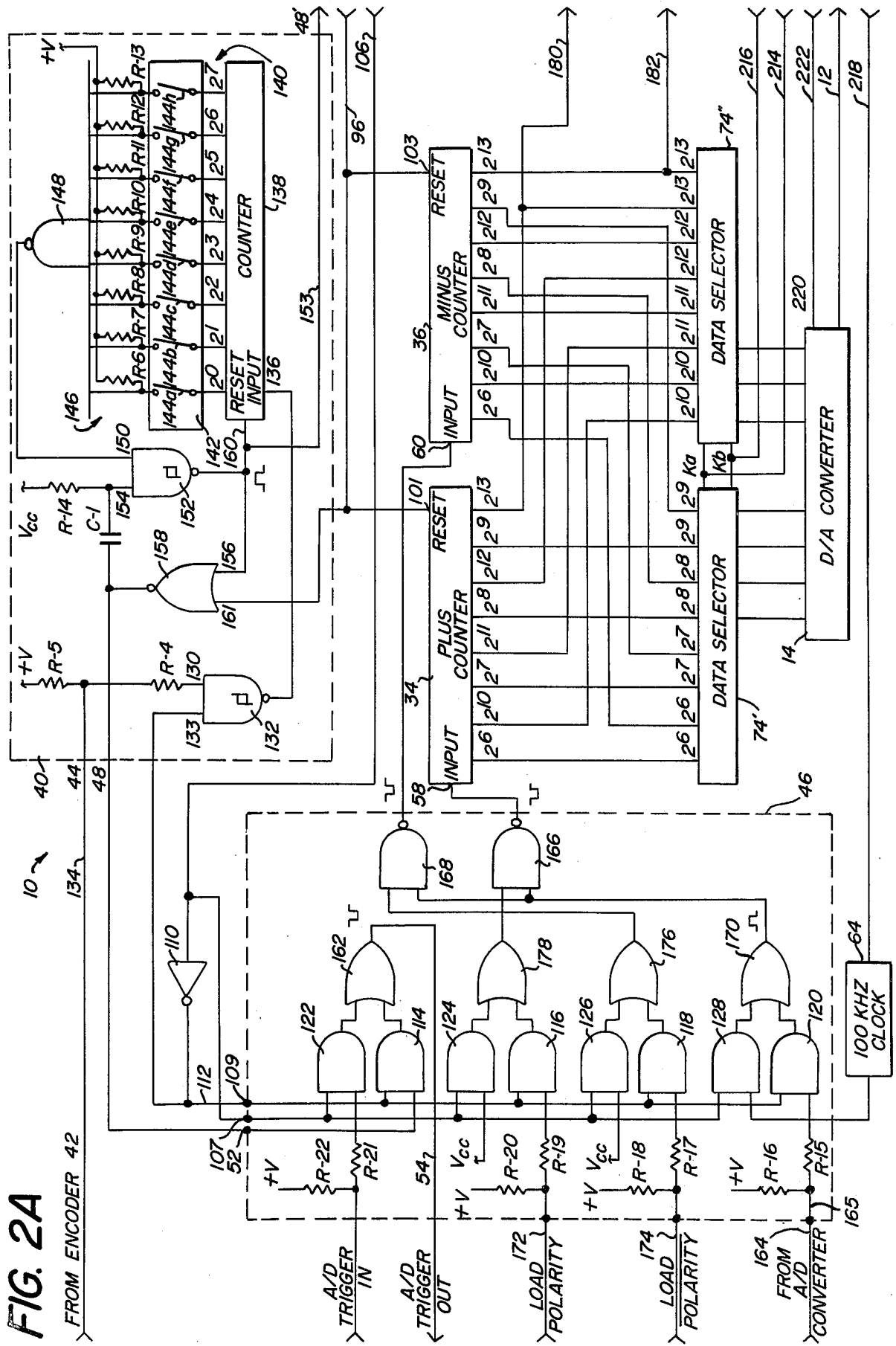
FIGS. 2A and 2B are a schematic diagram of the circuit comprising the present invention.
Figure 2B:
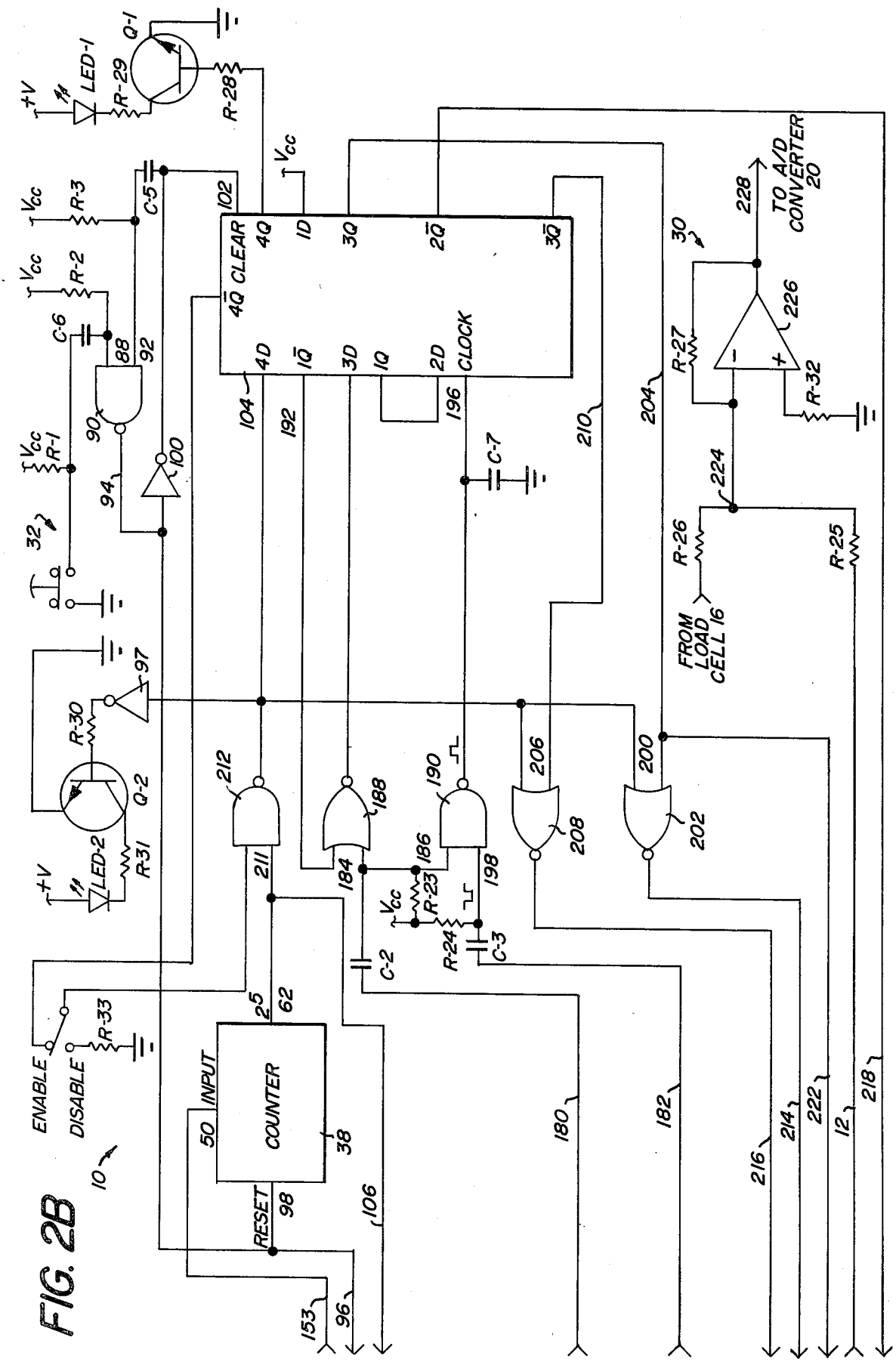

Turning now to FIGS. 2A and 2B, there is illustrated a circuit diagram for an auto zero circuit 10 constructed in accordance with the present invention. When start switch 32 is depressed, a momentary "low" is applied to input terminal 88 of NAND gate 90. (See FIG. 2B.) Since input terminal 92 of NAND gate 90 is kept "high" by the voltage Vcc, a momentary "high" appears on line 94. As used herein, a "high" voltage level corresponds to a binary logic state usually designated as "1" and a "low" voltage level corresponds to a binary logic state usually designated as "0". In general, all voltage levels below a specified logic threshold voltage are considered to be "low" and all voltage levels above that threshold voltage are considered to be "high". Consequently, when a voltage signal crosses the logic threshold voltage, there is a transition between the "low" and the "high" levels; in other words, there is a transition between binary logic states.

The momentary "high" on line 94 resets segment counter 38 via line 96 and reset input terminal 98 and causes the count in counter 38 to be reset to zero. Counter 38 increases one count for each pulse applied to its input terminal 50 and generates an output signal at its output terminal 62 when the count in counter 38 reaches the preselected value N. The count in counter 38 is reset to zero each time an input pulse is applied to its input terminal 98. In the preferred embodiment, the A/D converter 20 is strobed sixty-four times for a single revolution of belt 22. Thus, in the preferred embodiment, N is sixty-four. Accordingly, counter 38 must generate an output signal at its output terminal 62 when the count in counter 38 reaches sixty-four. A suitable commercially available counter is manufactured by RCA under the product designation CD4020A. When using such a counter, output terminal 62 is the $2^6$ output of the counter.

The momentary "high" generated by NAND gate 90 (by depressing start switch 32) also resets plus and minus counters 34 and 36, respectively, and quadruple D-type flip-flop 104. Thus, the "high" on line 96 is applied to reset inputs 101 and 103 of counters 34 and 36 as well as the clear input terminal 102 of quadruple D-type flip-flop 104. The operation of flip-flop 104 is described in detail below.

When the momentary "high" is applied to segment counter 38, its output 62 goes "low" and circuit 10 is placed in the "compute" mode of operation. The "low" generated by segment counter 38 is applied to input terminal 107 of data selector 46 via lines 106 and 108. Simultaneously, a "high" is applied to input terminal 109 of data selector 46 via line 106, inverter 110 and line 112.

The "low" applied to input terminal 107 disables AND gates 122, 124, 126 and 128. Conversely, the "high" applied to input terminal 109 enables AND gates 114, 116, 118 and 120. Accordingly, during the "compute" mode of operation, AND gates 114 through 120 are disabled and AND gates 122 through 128 are enabled.

Pulses generated by encoder 42 are applied to input terminal 130 of NAND gate 132 via line 134 and resistor R-4. Input terminal 130 is normally high due to the plus voltage V applied to resistor R-5. Each time the output of encoder 42 goes "low", input terminal 130 of NAND gate 132 goes "low". Since input terminal 133 is "high", (the output of segment counter 38 is "low" and the output of inverter 110 is "high"), the output of NAND gate 132 goes "high" each time the output of encoder 42 goes "low". The output of NAND gate 132 is applied to input terminal 136 of counter 138. Counter 138 is a commercially available counter whose stored count increases by one each time a positive pulse is is applied to its input terminal 136. The stored count in counter 138 appears in digital form on lines 140. In the preferred embodiment, counter 138 is a binary counter known generally as a 4020 counter. One such counter is manufactured by RCA Corporation under the product designation CD4020A.

Output lines 140 of counter 138 are applied to the inputs of rocker arm switch 142. By selectively closing desired toggle switches 144-A through 144-H, it is possible to program the number of input pulses which must be applied to input terminal 44 of programmable belt divider 40 to generate a single output pulse at output terminals 48, 48' thereof. In this way, rocker arm switch 142 controls the value of "N", the number of times A/D converter 20 is strobed during a single revolution of belt 22.

NAND gate 148 is enabled (its output is "low") when all of its inputs are "high". Assuming that encoder 42 generates thirty-one output pulses each time belt 22 rotates 1/64th of its total length, toggle switches 144-A through 144-E will be closed while switches 144-F through 144-H will remain open. As long as the count in counter 138 is less than thirty-one, at least one of the inputs to NAND gate 148 will remain "low" and NAND gate 148 will remain disabled. When the count in counter 138 reaches thirty-one, all of the inputs to NAND gate 148 will be "high" and NAND gate 148 will be enabled (its output will go "low").

The "low" generated by NAND gate 148 is applied to input terminal 150 of NAND gate 152. Input terminal 154 of NAND gate 152 is normally "high" as a result of the positive voltage Vcc applied to input terminal 154 through resistor R-14. The "low" generated by NAND gate 148 causes the output of NAND gate 152 to go "high". The "high" at the output of NAND gate 152 is applied to input terminal 156 of NOR gate 158, reset input terminal 160 of counter 138 and input terminal 50 of segment counter 38 (see FIG. 2B). The "high" applied to input terminal 50 of segment counter 38 increases the count in segment counter 38 by one. The "high" applied to reset input terminal 160 of counter 138 clears counter 138 and resets its stored input to zero. The "high" applied to input terminal 156 of NOR gate 158 causes the output of NOR gate 158 to go "low". Since the count in counter 138 has been reset to zero, the output of NAND gate 148 goes "high" and output of NAND gate 152 goes "low". The "low" generated by NAND gate 152 is applied to input terminal 156 of NOR gate 158 causing the output of NOR gate 158 to go "high" since its remaining input terminal 161 is "low".

In summary, each time a predetermined number of pulses has been applied to counter 138, a positive going pulse appears at the output of NAND gate 152 and a negative going pulse appears at the output of NOR gate 158. The positive going pulse appearing at the output of NAND gate 152 is applied to input terminal 50 of segment counter 38 via line 153 and increases the stored count in segment counter 38 by one. The negative going pulse appearing at the output of NOR gate 158 is applied to input terminal 52 of data selector 46.

The negative going pulse applied to input terminal 52 of data selector 46 is applied to the lower input terminal of AND gate 114. Since the upper input terminal of AND gate 114 is kept "high" by the output terminal of inverter 110 during the "compute" mode of operation, a negative going pulse appears at the output of OR gate 162 each time a negative going pulse is applied to input terminal 52 of data selector 46. Each negative going pulse appearing at the output of OR gate 162 is applied to the strobe input of A/D converter 20 via line 54. A/D converter 20 is strobed by the application of a negative going pulse to its strobe input terminal. Accordingly, A/D converter 20 will generate a plurality of pulses at its output terminal 56 (see FIG. 1) representative of the analog signal generated by load cell 16 each time a negative going pulse is generated by OR gate 162.

The train of pulses generated by A/D converter 20 is applied to the lower input of AND gate 120 via line 165 and resistor R-15. The output of AND gate 120 goes "high" for each positive pulse applied to its lower input terminal via line 165 since its upper input terminal is kept "high" by the output of inverter 110 during the "compute" mode of operation. Each "high" appearing at the output of AND gate 120 will be applied to the lower input terminal of NAND gates 166 and 168 via OR gate 170.

Whether the pulse generated by OR gate 170 is applied to plus counter 34 or minus counter 36 will be determined by the polarity signal generated by A/D converter 20. If the polarity signal generated by A/D converter 20 is positive, load polarity input 172 to data selector 46 will be "high" and the load polarity input 174 to data selector 46 will be "low". The "low" on load polarity input 174 inhibits AND gate 118 causing OR gate 176 to apply a "low" to the upper input terminal of NAND gate 168.

The "high" appearing at load polarity input 172 enables AND gate 116 and causes OR gate 178 to enable NAND gate 166. When so enabled, the output of NAND gate 166 goes "low" each time the output of OR gate 170 goes "high". In this manner, one negative going pulse will be generated by NAND gate 166 for each positive going pulse generated by A/D converter 20. These negative going pulses are applied to input terminal 58 of plus counter 34 and cause the stored count in plus counter 34 to increase one count for each negative pulse applied to input terminal 58.

In a like manner, a negative going pulse is applied to input terminal 60 of minus counter 36 via NAND gate 168 for each positive going pulse generated by A/D converter 20 whenever the polarity output of A/D converter 20 is negative (load polarity input "low" and load polarity input "high").

Reviewing the foregoing, each time a preselected number of positive going pulses is applied to input terminal 44 of programmable belt divider 40, a negative going pulse will be generated at the output terminal 48 of programmable belt divider 40 and a positive going pulse will be generated at the output terminal 48' of programmable belt divider 40. The negative going pulse appearing at output terminal 48 of programmable belt divider 40 is applied to input terminal 52 of data selector 46 and causes a negative going strobe pulse to be generated by OR gate 162. This strobe pulse is applied to A/D converter 20 via line 54 and causes A/D converter 20 to sample the output of load cell 16.

When so strobed, A/D converter 20 generates a series of loading pulses at its output terminal 56 which pulses are applied to loading input terminal 164 of data selector 46. Each positive going pulse applied to loading input terminal 164 causes OR gate 170 to generate a positive going pulse at its output. Whether the series of positive going pulses is applied to plus counter 34 or minus counter 36 is determined by the polarity output of A/D converter 20. Particularly, if the polarity output of A/D converter 20 is positive (load polarity input "high" and load polarity input "low"), NAND gate 166 is enabled and the pulses generated by OR gate 170 are applied to plus counter 34. If the polarity output of A/D converter 20 is negative (load polarity input "low" and load polarity input "high"), NAND gate 168 is enabled and the pulses generated by OR gate 170 are applied to minus counter 36.

The foregoing operation is repeated each time programmable belt divider 40 generates a negative going pulse at its output terminal 48. After programmable belt divider 40 has generated N (64) output pulses, output terminal 62 of segment counter 38 goes "high" and operation switches from the "compute" to the "tared" mode. As noted above, the output of load cell 16 is sampled sixty-four times during the "compute" mode of operation. Accordingly, segment counter 38 will generate a "high" at its output terminal 62 when the stored count in counter 38 is sixty-four. In the preferred embodiment, segment counter 38 is a binary counter known generally in the art as a 4020 counter. One such counter is a CD4020A counter manufactured by RCA Corporation. When using such a counter, output terminal 62 is the $2^6$ output of the counter. This output will go "high" only when the count in counter 38 is 64 or greater.

The resultant "high" appearing at output terminal 62 of segment counter 38 transfers auto zero circuit 10 to the "tared" mode of operation. The transfer of circuit 10 to the "tared" mode of operation is indicated by LED-2, the tare mode indicator lamp designated 63 in FIG. 1. The "high" applied to input terminal 211 of NAND gate 212 causes the output of the NAND gate to go "low". This "low" is applied to the input terminal of invertor 97 which generates a "high" at its output turning on transistor Q-2. This grounds the collector of transistor Q-2 and enables LED-2.

The "high" applied to input terminal 107 of data selector 46 via lines 106 and 108 enables AND gates 122 through 128. Conversely, the "low" applied to input terminal 109 of data selector 46 via line 106, inverter 110 and line 112 disables AND gates 114 through 120. Since AND gate 128 is enabled, the output of the 100 Khz oscillator 64 is applied to the lower inputs of NAND gates 166 and 168 via AND gate 120 and OR gate 170. Additionally, since the lower inputs to NAND gates 124 and 126 are kept "high" by a positive voltage Vcc, both NAND gates 166 and 168 are enabled. Accordingly, the output of 100 Khz clock 64 is simultaneously applied to input terminals 58 and 60 of counters 34 and 36, respectively. The stored count in each counter increases at a very rapid rate until the counter having the higher stored count at the end of the "compute" mode operation overflows. For purposes of illustration, it will be assumed that plus counter 34 had the higher stored count at the end of the "compute" mode of operation.

When plus counter 34 overflows, a transition to a "low" appears at its $2^{13}$ output. The transition is applied to input terminals 184 and 186 of NOR gate 188 and NAND gate 190, respectively, via line 180 and the differentiator circuit comprising resistor R-23 and capacitor C-2. The differentator circuit differentiates the signal on line 180 so that a sharp negative going pulse is applied to both inputs 184 and 186. The signal applied to input terminal 186 of NAND gate 190 causes the output of NAND gate 190 to generate a positive going pulse. Simultaneously, the negative pulse applied to input terminal 184 of NOR gate 188 will have no effect on the output of NOR gate 188 (its output will remain "low") since NOR gate 188 is disabled by the "high" appearing at output terminal 192 of quadruple D-type flip-flop 104.

Quadruple D-type flip-flop 104 is a commercially available flip-flop. One such flip-flop is manufactured by National Semiconductor under the product designation MM74 C175. When a "low" is applied to its clear input terminal 102, all of the Q outputs go "low" and all of the $\overline{Q}$ outputs go "high". Whenever a positive pulse is applied to its clock input terminal 196, its Q outputs will conform to their corresponding D inputs and its $\overline{Q}$ outputs will conform to the complement of their corresponding D inputs. Significantly, the clock input 196 of flip-flop 104 is triggered by the leading edge of the positive going pulse applied thereto. As a result, a capacitor C-7 is provided at its clock input to delay the triggering of flip-flop 104. If this capacitor was not provided, the information would be clocked into flip-flop 104 before it is available on certain D inputs (specifically, the 3D and 4D inputs).

As noted above, the negative going pulse applied to input terminal 184 of NOR gate 188 will have no effect on the output of NOR gate 188 since NOR gate 188 is disabled by the "high" generated on output terminal 192 of flip-flop 104. This negative going pulse does, however, cause a positive going pulse to be applied to clock input terminal 196. The positive going pulse applied to clock input terminal 196 causes output terminal 1Q to go "high" and output 1$\overline{Q}$ to go "low" (the 1D input is kept "high" by the positive voltage Vcc). The effect of this clock pulse is to enable NOR gate 188 (the 1$\overline{Q}$ output is now "low") and to change the 2D input from a "low" to a "high" condition.

When the minus counter overflows, a "low" appears on line 182 and is applied to the differentiator circuit comprising resistor R-24 and capacitor C-3. This differentiator circuit generates a negative going pulse which is applied to input terminal 198 of NAND gate 190. The negative going pulse applied to input terminal 198 of NAND gate 190 causes the output of NAND gate 190 to apply a positive going pulse to input terminal 196 of flip-flop 104. Since NOR gate 188 is now enabled (1$\overline{Q}$ is "low"), it will sense that pulse counter 34 was the first counter to overflow (there is no negative going pulse applied to its input terminal 184) and the output of NOR gate 188 will remain "low". Since the 3D input to flip-flop 104 remains "low", the 3Q output remains "low" and the 3$\overline{Q}$ output remains "high". The "low" appearing at the 3Q output of flip-flop 104 is applied to input terminal 200 of NOR gate 202 via line 204. Similarly, the "low" appearing at the 3$\overline{Q}$ output of flip-flop 104 is applied to input terminal 206 of NOR gate 208 via line 210.

NOR gates 202 and 208 are both enabled by the "low" appearing at the output of NAND gate 212 during the "tared" mode of operation. Accordingly, a "high" appears at the output of NOR gate 202 and a "low" appears at the output of NOR gate 208. These outputs are applied via lines 214 and 216 to the Ka and Kb inputs of data selectors 74' and 74". The "high" applied to the Ka inputs of data selectors 74' and 74" enable the odd inputs of the data selectors and the "low" applied to the Kb inputs to data selectors 74' and 74" disable their even inputs. Accordingly, when a "high" is generated by NOR gate 202, data selectors 74' and 74" will pass the output of plus counter 34 and when NOR gate 208 generates a positive signal the data selectors will pass the outputs of minus counter 36. Since line 214 is "high" and line 216 is "low", data selectors 74', 74" pass the output of plus counter 34.

At this point, it should be noted that only the $2^6$ through $2^{13}$ output of plus and minus counters 34 and 36, respectively, are applied to data selectors 74' and 74". The $2^0$ through $2^5$ outputs are not used. This procedure effectively divides the count in counters 34 and 36 by sixty-four (N) and serve the function of dividers 78 and 80 (see FIG. 1) as previously explained. It should be apparent to those skilled in the art that all of the outputs of counters 34 and 36 could be used if appropriate dividers interfaced the counters and data selectors.

In addition to conforming the 3Q and 3$\overline{Q}$ outputs of flip-flop 104 with the 3D input thereof, the second clock pulse applied to input terminal 196 of flip-flop 104 conforms the 2$\overline{Q}$ output of flip-flop 104 with the 2D input thereof. Since the 2D input is "high", the 2$\overline{Q}$ output is "low". This "low" disables the 100 Khz clock 64 via line 218.

The "low" applied to input terminal 200 of NOR gate 202 is also applied to input terminal 220 of D/A converter 14 via line 222. The "low" on line 222 tells D/A converter 14 that plus counter 34 was the first counter to overflow and causes the analog output signal of converter 14 generated on line 12 to have a negative polarity. The output of D/A converter 114 is applied to summing junction 224 and is combined with the output from load cell 16. The combined signal is applied to the inverting input terminal of operational amplifier 226 (wired to operate as a difference amplifier) which generates an output signal on line 228 which is representative of the actual weight of material on belt 22 during loaded operations of conveyor 15.

The foregoing analysis assumed that plus counter 34 had a greater stored count than minus counter 36 at the end of the "compute" mode of operation. It will be apparent to those skilled in the art that a similar analysis could be made with the opposite assumption. The only difference in this analysis would be that the output of NOR gate 188 would be "high" when the second counter overflowed and that a "high" would be generated on line 216 and a "low" would be generated on line 214. This would cause data selectors 74', 74" to pass the stored count in minus counter 36 and cause the polarity of the output signal generated by D/A converter 14 to be positive.

If counter 34 or counter 36 overflows while circuit 86 is still in the "compute" mode of operation, an over-range condition exists and circuit 10 will not function properly. In such a situation, NAND gate 190 is enabled and a clock pulse is applied to clock input terminal 196 of flip-flop 104 while circuit 10 is still in the "compute" mode of operation and the output of NAND gate 212 is "high". The "high" appearing at the output of NAND gate 212 is transferred to the 4Q output of flip-flop 104 and transistor Q-1 is turned on. Since transistor Q-1 is on, light emitting diode LED-1 is enabled indicating that an overflow condition has occurred. In such a situation, the internal zero adjustment in load cell 16 must be readjusted and start switch 32 again depressed so that the entire operation is repeated.

The preferred values of the resistances and capacitors of the circuit illustrated in FIGS. 2A and 2B and described above are given in Table I below.

Table I

| Resistor (Ohms) | |
| --- | --- |
| R-1 | 180 K |
| R-2 | 20 K |
| R-3 | 510 K |
| R-4 | 10 K |
| R-5 | 4.7 K |
| R-6 – R-13 | 180 K |
| R-14 | 47 K |
| R-15 | 10 K |
| R-16 | 2 K |
| R-17 | 10 K |
| R-18 | 2 K |
| R-19 | 10 K |
| R-20 | 2 K |
| R-21 | 10 K |
| R-22 | 2 K |
| R-23 | 20 K |
| R-24 | 20 K |
| R-25 | 3.32 K |
| R-26 | 20 K |
| R-27 | 20 K |
| R-28 | 47 K |
| R-29 | 180 |
| R-30 | 47 K |
| R-31 | 110 |
| R-32 | 7.5 K |
| R-33 | 180 K |
| Capacitors | |
| C-1 | 330 pf |
| C-2 | 220 pf |
| C-3 | 220 pf |
| C-5 | 0.1 mf |
| C-6 | 220 pf |
| C-7 | 220 pf |

As used in the appended claims, the term "rollover counter" includes any binary counter whose stored count returns to zero once it has reached its capacity and the next input pulse is applied thereto.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for generating a belt tare compensation signal for use with a load cell in operative contact with a conveyor belt dividable into N equal segments comprising:

first means for generating N loading and N polarity signals, one said loading and one said polarity signal being generated each time said belt advances one said segment, said loading signal being a pulse train representative of the magnitude of the instanteous output of said load cell, said polarity signal indicating whether the output of said load cell is greater than or less than a predetermined value;

second means for generating a difference signal representative of the difference between the number of pulses generated by said first means when said polarity signal indicates that the output of said load cell is greater than said predetermined value and the number of pulses generated by said first means when said polarity signal indicates that the output of said load cell is less than said predetermined value; and divide by N means responsive to said difference signal for generating a belt tare compensation signal representative of the output of said load cell for a single non-loaded revolution of said conveyor belt.

2. Apparatus in accordance with claim 1 wherein said first means comprises:

programmable belt divider means for generating a single pulse each time said belt advances one said segment; and A/D converter means for sampling the output of said load cell each time said programmable belt divider means generates an output pulse and for generating said polarity and loading signals in accordance with said sampled output.

3. Apparatus in accordance with claim 1 including means for regulating the polarity of said belt tare compensation signal in accordance with the output of said load cell.

4. Apparatus in accordance with claim 1 wherein said second means comprises:

a first counter;

a second counter;

means for applying said loading signal to said first counter when said polarity signal indicates that the output of said load cell is greater than said predetermined value and for applying said loading signal to said second counter when said polarity signal indicates that the output of said load cell is less than said predetermined value; and means for computing the difference between the number of pulses applied to said first counter and the number of pulses applied to said second counter and for generating a difference signal representative of said computed difference.

5. Apparatus in accordance with claim 4 wherein said first and second counters are rollover counters and wherein said means for computing the difference between the number of pulses applied to said first and said second counters includes:

means for generating a high frequency pulse train;

means for applying said high frequency pulse train to said first and second counters after said first means has generated N loading and N polarity signals whereby the stored counts in said first and second counters increase at a rapid rate; and rollover detector means for detecting when said first and said second counters have both overflowed and for disabling said means for generating a high frequency pulse train after both said counters have overflowed.

6. Apparatus in accordance with claim 4 including means for indicating that either said first or said second counter has reached its stored capacity before said first means generates N loading and N polarity signals.

7. Apparatus for generating a belt tare compensation signal comprising:
- a load cell in operative contact with a feed conveyor belt dividable into N equal segments;
- means for adjusting the output of said load cell such that the output of said load cell is zero when said load cell is in contact with at least one of said N equal segments;
- means for sampling the output of said load cell each time said belt advances a distance equal to one said segment and for generating a first signal representative of the net value of said sampled outputs of said load cell during a single non-loaded revolution of said belt;
- divide by N means responsive to said first signal for generating a tare compensation signal representative of the average output of said load cell during a single non-loaded revolution of said conveyor belt.

8. Apparatus in accordance with claim 7 including means for regulating the polarity of said belt tare compensation signal in accordance with the output of said load cell.

9. Apparatus in accordance with claim 7 wherein said means for sampling the output of said load cell includes:
- a first counter;
- a second counter;
- means for generating N loading signals, one said loading signal generated each time said belt advances one said segment, said loading signal being a pulse train representative of the magnitude of the instanteous output of said load cell;
- means for applying said pulse train to said first counter when the output of said load cell is positive and for applying said pulse train to said second counter when the output of said load cell is negative; and
- means for computing the difference between the number of pulses applied to said first counter and the number of pulses applied to said second counter and for generating a difference signal representative of said computed difference.

10. Apparatus in accordance with claim 9 wherein said first and second counters are rollover counters and said means for computing the difference between the number of pulses applied to said first and second counters comprises:
- means for generating a high frequency pulse train;
- means for applying said high frequency pulse train to said first and second counters after said first means has generated N loading signals whereby the stored count in said first and second counters increases at a rapid rate; and
- rollover detector means for detecting when said first and second counters have both overflowed and for disabling said means for generating a high frequency pulse train after both said counters have overflowed.

11. Apparatus in accordance with claim 9 wherein said means for generating N loading signals comprises:
- programmable belt divider means for generating a single pulse each time said belt advances one said segment; and
- A/D converter means for sampling the output of said load cell each time said programmable belt divider means generates an output pulse and for generating said polarity and loading signals in accordance with said sampled output.

12. Apparatus in accordance with claim 9 including means for indicating that said first or said second counter has overflowed before said means for sampling the output of said load cell has generated N loading signals.

* * * * *